US006876162B2

(12) United States Patent
Bilcke

(10) Patent No.: US 6,876,162 B2
(45) Date of Patent: Apr. 5, 2005

(54) METHOD AND SYSTEM FOR CONTROLLING DRIVE MOTORS OF AT LEAST TWO MACHINES

(75) Inventor: Walter Bilcke, Geluveld (BE)

(73) Assignee: Picanol N.V., Ieper (BE)

( * ) Notice: Subject to any disclaimer, the term of this patent is extended or adjusted under 35 U.S.C. 154(b) by 0 days.

(21) Appl. No.: 10/148,214

(22) PCT Filed: Dec. 9, 2000

(86) PCT No.: PCT/EP00/12455
§ 371 (c)(1),
(2), (4) Date: Jun. 10, 2002

(87) PCT Pub. No.: WO01/43271
PCT Pub. Date: Jun. 14, 2001

(65) Prior Publication Data
US 2002/0180399 A1 Dec. 5, 2002

(30) Foreign Application Priority Data
Dec. 10, 1999 (BE) .............................................. 9900806

(51) Int. Cl.⁷ ................................................. H02P 1/54
(52) U.S. Cl. ............................. 318/34; 318/41; 318/77; 318/85; 318/139
(58) Field of Search ............................ 318/34, 41, 77, 318/85, 111–113, 254, 701, 705, 139

(56) References Cited

U.S. PATENT DOCUMENTS

| 3,746,957 | A | * | 7/1973 | Forster et al. .............. 318/138 |
| 4,061,947 | A | * | 12/1977 | Vogel .......................... 318/77 |
| 4,310,787 | A | * | 1/1982 | Seeger et al. ................. 318/85 |
| 4,390,821 | A | * | 6/1983 | Krampe et al. ............... 318/85 |
| 4,429,722 | A | * | 2/1984 | Herzog ........................ 139/48 |
| 4,617,497 | A | * | 10/1986 | Wolf ........................... 318/78 |
| 4,939,431 | A | * | 7/1990 | Yamazaki et al. ............ 318/41 |
| 5,202,611 | A | * | 4/1993 | Uehara et al. ................ 318/85 |
| 5,220,945 | A | * | 6/1993 | Vandeweghe et al. ...... 139/114 |
| 5,412,301 | A | * | 5/1995 | Jornot et al. ................ 318/640 |
| 5,535,481 | A | * | 7/1996 | Hartmeier et al. ........... 19/260 |
| 6,247,503 | B1 | | 6/2001 | Shaw et al. |
| 6,326,747 | B1 | * | 12/2001 | Shiba et al. ................. 318/85 |
| 6,525,496 | B1 | * | 2/2003 | Bilcke ......................... 318/432 |

FOREIGN PATENT DOCUMENTS

| DE | 3822420 A1 | 1/1990 |
| DE | 4312041 A1 | 10/1994 |
| EP | 0752753 A2 | 1/1997 |
| EP | 0802270 A2 | 10/1997 |

* cited by examiner

*Primary Examiner*—Rina Duda
(74) *Attorney, Agent, or Firm*—Bacon & Thomas, PLLC

(57) ABSTRACT

The invention relates to method and apparatus for controlling the powering of electric drive motors (8) of a group of at least two machines (2, 3, 4), the motors operating in periodic motions, wherein the periodic motions are mutually coordinated in a manner so as to control a parameter which is representative of the operations of the machines. Parameters may include one or more of the sum of the electric power applied to the drive motors, the magnitude of the noise level generated by the machines and machine-caused vibrations. The drive motors of one machine may be controlled as a function of the periodic motion of the drive motor of the other machine, and power applied to one drive motor may be applied as a function of a mutually related drive motion of the machines.

19 Claims, 4 Drawing Sheets

METHOD AND SYSTEM FOR CONTROLLING DRIVE MOTORS OF AT LEAST TWO MACHINES

BACKGROUND OF THE INVENTION

A. Field

The present invention relates to a method and system for powering electric drive motors of a group of at least two machines wherein the drive motors operate in periodic motions and receive their power from at least one electric power source.

B. Related Art

Machines operating in periodic motions illustratively may be weaving machines containing several components which move in a predetermined, repetitive manner. For instance one such component is a reed which is driven at given times in one and then the other direction. Such components also include shed forming means which are moved up and down at given times. Further such components include—with respect to gripper looms, for instance—grippers and their drive elements moving said grippers at given times into and then out of a shed. When several such components are driven by a drive motor in such a periodically recurring sequence of motions, the drive motor also moves in a repetitive or periodic motion. As regards weaving machines, the period of said motion is defined by the number of weaving cycles making up one weaving pattern. A weaving pattern is the manner in which warps and fillings are interwoven in accordance with a repeat pattern. The periodic displacement of the individual components generally results in periodic variation of the power being fed from a supply system to the drive motor. This periodic variation of power is required so that the angular speed of the drive motor will vary only within narrow limits. Accordingly the power applied to the drive motor of a weaving machine will vary between a minimum and a maximum value. Consequently the power applied from such a power source to the drive motors of a group of weaving machines shall also vary. As a result such a power source must be able the feed the sum of the maximum values of the power required by the drive motors of a group of weaving machines. Therefore an expensive power source is required which, on account of the variable power being applied, operates at low efficiency and resulting high operating costs. Therefore an expensive power source is required which, on account of the variable power being applied, operates at low efficiency and resulting high operating costs.

As regards a combing machine comprising several synchronously driven shafts each fitted with individual electrical drives, it is known from the German patent document 195 09 209 A1 to fit a first drive motor with a measured-position pickup connected to a control unit. Based on the first drive's measured position values, the control unit establishes position setpoints for the remaining drives.

BRIEF SUMMARY OF INVENTION

The objective of the invention is to improve the powering of electrical drive motors for mechanically independent machines within a group of machines.

This problem is solved in that the periodic motions of at least two mechanically independent machines are related to each other in a way to control a parameter representing the operation of at least two of the machines.

In one embodiment of the present invention, the representative parameter is bounded by a maximum value and/or a change in the said representative parameter bounded to a given value.

In a further embodiment of the invention, the representative parameter comprises the sum of the electrical power fed to the drive motors and/or the magnitude of the noise generated by the machines and/or the machine-caused vibrations.

In accordance with the present invention, the power applied to the machines' drive motors is controlled by means of the machines' relative motions. As a result, the time-function of the total applied power may be controlled in a way that it shall vary only a little. Thereby current losses in the power source may be reduced and improvements in efficiency may be attained.

In a further embodiment of the present invention, the sequence of motions of the electric dive motor of at least one machine and preferably the sequences of motions of the electric drive motors of all the machines of a group of mechanically independent machines is controlled as a function of the periodic motion of the drive motor of at least one other machine of the group and preferably as a function of the motions of the drive motors of all other machines of the group. Thereby the consumed power and/or the vibrations and/or the noise levels of all machines in a weaving room may be controlled and substantially improved.

In a further embodiment of the invention the drive motor of each machine of a group of mechanically independent machines is controlled according to the same periodic motion and these periodic motions of the drive motors of this group are mutually phase-shifted. Illustratively the machines of a group are driven at the same periodic motions when several or all weaving machines of a weaving room manufacture the same-pattern weaves. Using phase-shifted modes of operation, both the applied power may be optimized and the vibration and noise levels may be reduced.

In a further embodiment of the invention, and with respect to one group of machines each comprising an electric drive motor which operates in periodic motion and which is connected to at least one power source applying electrical power, means are provided which match or relate the motions of at least two machines of the group to control a parameter representative of the operational mode, in particularly advantageous manner, the machines are equipped with a control driving the drive motors at constant torque. Periodical motion is especially marked in these machines.

In another embodiment of the invention, several interconnected power sources are used for the drive motors of the machines. In accordance with a particular embodiment, each machine may have one power source connected to the power source of the other machine(s).

In a further embodiment of the invention, the at least one power source is a DC source preferably including at least one electrical energy buffer.

In a further embodiment of the invention, the drive motors are switchable reluctance motors connected by switching devices to at least one power source. When combined with a DC power source, such reluctance motors will be particularly appropriate.

In a further embodiment of the invention, the mechanically independent machines are weaving machines wherein the main drive shafts are directly connected to the shafts of the associated drive motors. As a result, the angular position of the drive shaft of the drive motor corresponds to that of the weaving machine, the latter defining the periodic motion of the weaving machine depending on the weaving pattern. In this manner the motion of the individual weaving machines of a group of weaving machines can be controlled relative to each other in simple manner.

As regards groups of weaving machines, the invention advantageously allows eliminating interference-caused beats or vibrations. Such beats may arise in a weaving room because the weaving machines exhibiting small relative speed differentials will be in phase sometimes and out of phase at other times. Such beats however are averted by the invention because the motion of the drive motor of each weaving machine is controlled in relation to the motion of the other weaving machines, and consequently it is possible to prevent said machines from coming into phase. The result, with regard to the applied power, is that at least one power source need not be capable of supplying a peak current at an arbitrary time and later supplying only low power. Averting beats also offers the advantage that the noise levels and the vibrations generated by a weaving machine shall fluctuate less, and hence the maximum values of these vibrations and the noise levels also may be lowered.

Additional features of the invention are stated in the dependent claims and are described in the description below of the embodiments shown in the attached drawings.

DETAILED DESCRIPTION

Figure 1:
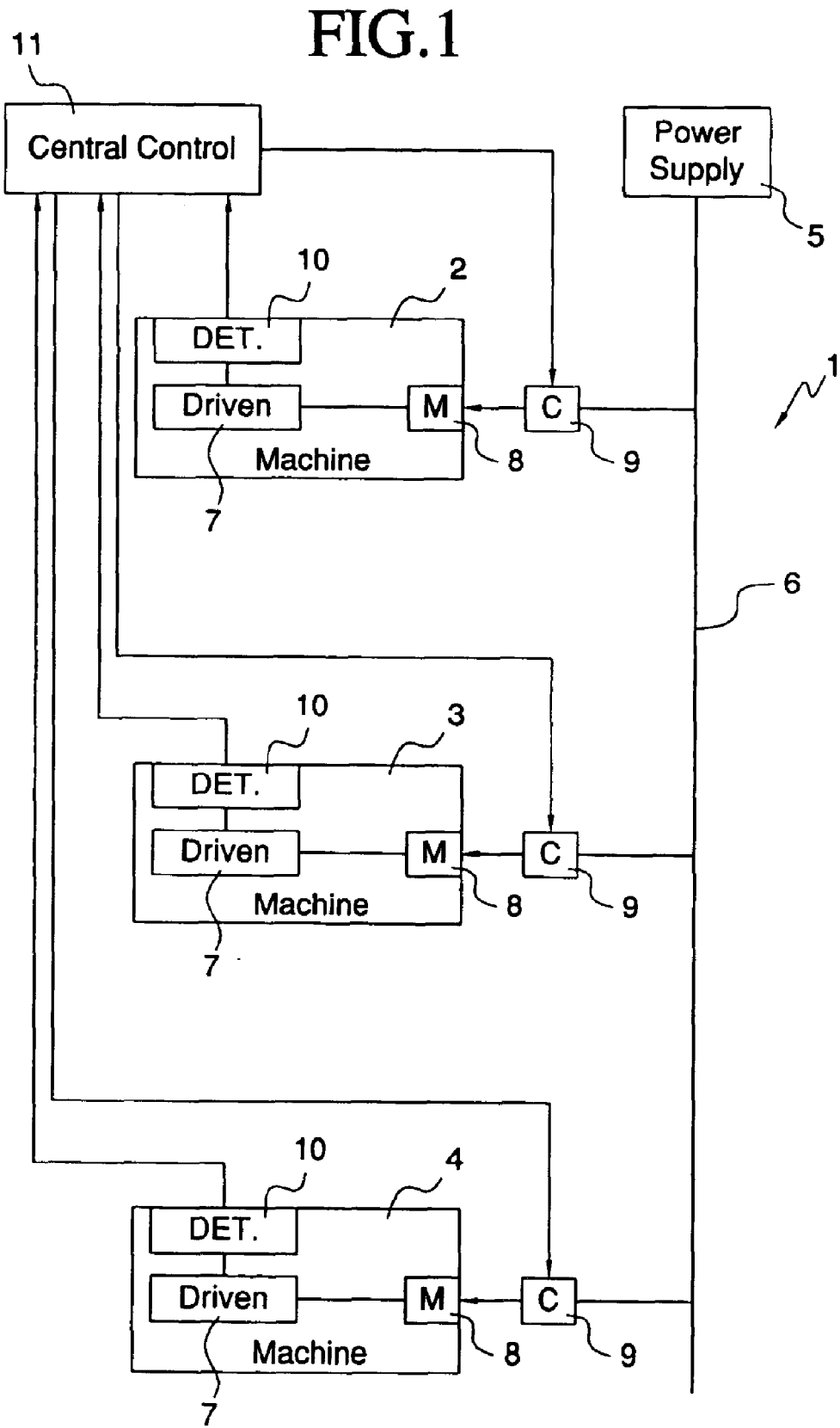
FIG. 1 shows a control block diagram for the drive motors of a group of weaving machines.

The control assembly 1 includes a group of mechanically independent machines 2, 3, 4, for instance weaving machines, and an electric power source 5 connected to a power line 6. Each machine 2, 3, 4 contains at least one component 7 which moves periodically and which is driven by an electric drive motor 8 in a corresponding periodic motion. For that purpose the power applied to the drive motor 8 is controlled in a periodic manner. Each machine 2, 3, 4 is fitted with control means 9 to apply power from the power source 5 to the particular drive motor 8.

When employing a switched reluctance motor as the drive motor 8, said means 9 in each case shall be a switching unit which is connected to the switched reluctance motor and which receives power from the power source 5 through the power line 6. In this case the power source 5 is a DC supply. Each control unit 9 is driven by a control unit 11 common to all switching units and transmitting control parameters in order to control the switched reluctance motors according to a periodic time function. For that purpose the angular position of the switched reluctance motors is controlled according to the predetermined motion, and specific windings of the switched reluctance motor are connected by means of the control unit 9 at predetermined times to the power source 5. The expression "motion" herein denotes the positions and the changes in position of the switched reluctance motor the motion of which is illustratively matched to the natural motion of the machine components.

In this embodiment the machines 2, 3, 4 are weaving machines of which the main shafts are driven directly by the drive shaft of the particular drive motor 8 or are integral with this drive shaft. In this manner the angular position of the drive motor's drive shaft corresponds with the angular position of the weaving machine's main drive shaft's. The periodic motion of the weaving machine is determined by that angular position. Such weaving machines are known from applicant's patent documents WO 98/31856 (see U.S. Pat. No. 6,247,503) and WO 99/27426 (see U.S. Pat. No. 6,525,496). Reference is hereby explicitly made to the contents of these two documents. The document WO 99/27426 describes a procedure by means of which a drive motor is powered into a specified motion, namely the power applied to the drive motor is periodically controlled as function of the machine's angular position. Said procedure is also applicable in this case to periodically step up or down the control parameters of the drive motors 8. Being known from the document WO 99/27426, this procedure shall not be extensively discussed herein.

Each of the machines 2, 3, 4 is fitted with an angle-measuring detector 10 detecting the angular position of the main drive shaft of the machines 2, 3, 4. The angular-position detector 10 of each machine 2, 3, 4 is connected to the control unit 11 of the group of machines. As a result, the control unit 9 of each machine 2, 3, 4 can be controlled as a function of the output signals of the angular-position detectors 10 determining the angular positions of the machines 2, 3 and 4. In another embodiment, the angular position of the machines 2, 3, 4 is determined by the electrical position of the drive motor 8 itself.

The periodic motion of a drive motor 8 of a machine 2, 3 or 4 is controlled as a function of the periodic motion of a drive motor 8 of another machine of the group. Preferably the electrical drive motors 8 of all machines 2, 3, 4 will be controlled as a function of the motions of the drive motors 8 of all machines 2, 3, 4 of the said group. In this procedure the power applied by the power source 5 to the electrical drive motors 8 of each machine 2, 3, 4 is controlled as a function of the power applied by the power source 5 to the electric drive motor 8 of one or more machines 2, 3, 4 of said group. Because the angular position of the particular machine determines the applied power, the drive motor of each machine 2, 3, 4 may be controlled as a function of the angular position of one or more of the other machines.

In a preferred embodiment of the invention, the periodic motion of each machine 2, 3 and 4 is determined as a function of the periodic motion of the other machines 2, 3, 4 of the group, so that the maximum value and/or a change in the magnitude of the total power applied to the electrical drive motors 8 of the machines 2, 3, 4 of said group shall be bounded. It is assumed with respect to the embodiment of FIG. 2 that the period of motion of each machine 2, 3, 4 amounts to two revolutions, i.e. 720° and in that the machines 2, 3, 4 are driven with the same motions. This shall be the case for instance with respect to weaving machines when a repeat pattern shall recur after two fillings and when identical machines weave the same fabric.

In a manner known from patent document WO 99/27426, power is applied to each drive motor 8 of the machines 2, 3 and 4 of the group as a function of the angular position of the particular machine. For that purpose the control parameters are determined by the control unit 11 and are stored as a function of the angular position of each of the machines 2, 3, 4 in order to control each drive motor in each angular position by means of said stored control parameters. Illustratively such control parameters are the value and/or the time at which the current and/or the voltage is applied to the drive motor 8.

Illustratively, in this embodiment, the initial point may be a reference angular position, namely the time when the filling of the preceding weaving cycle was beaten-up. For the sake of simplicity this example assumes that the time-functions of supplied power relative to the angular position of the drive motor 8 of each machine 2, 3 and 4 are equal.

During each period of motion, the control unit 11 calculates the total power applied to the drive motors 8 of the machines 2, 3 and 4 of said group. For instance the reference position of the machines 3 and 4 shall be shifted relative to the reference position of the machine 2 until the maximum value of the total applied power to all machines 2, 3 and 4 shall be minimized. In this manner the drive-motor phases shall be shifted in time in relation to one another. As a result, the periodic motion of each machine shall be matched to the periodic motion of the group's other machines.

In a procedural variation regarding its adjustment, the reference position of the motions of the machines 3 and/or 4 shall be shifted until the difference between the magnitude of the total applied power and a mean value shall be a minimum. The results attained by either adjustment should differ only little from one another.

Figure 2:
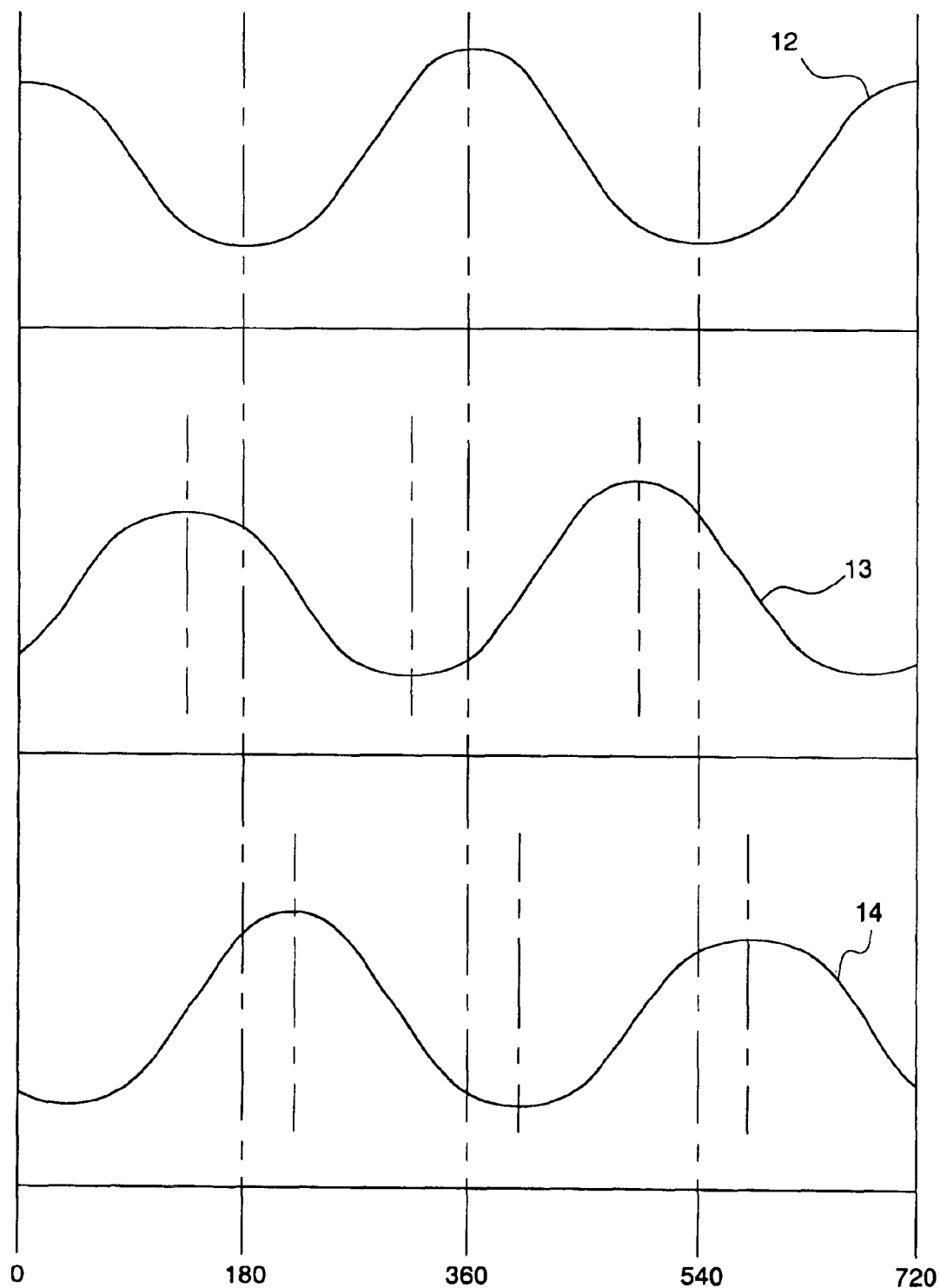
FIG. 2 shows the plots of periodic motions of the drive motors of the group of machines of FIG. 1.

As regards the embodiment of FIG. 2, it follows from the above discussed design that the motion 12 of the machine 2 begins at 0°, the motion 13 of machine 3 at 150° and the motion 14 of machine 4 at 600°. The power applied to the particular machines 2, 3 and 4 is correspondingly phase shifted. The maximum power is then supplied to the drive motors 8 of the individual machines 2, 3 and 4 at different angles or different times in a manner such that the total power supplied by the power source 5 will be approximately constant.

When weaving a pattern running over several cycles, the periodic motion also will cover several weaving cycles. For each weaving-pattern period, the time-function of applied power for the drive motor of a weaving machine can be established as a function of the angular position of the particular weaving machine. If the number of weaving cycles of the weaving pattern is different within the weaving machines of a group, and if the average angular speed of the weaving machines is also different, then the periods of motion of the various weaving machines may be determined as the smallest common multiple of the number of weaving cycles and the average angular speed of the weaving machines may also be determined. Depending on this motion, the time-function of applied power for such a period of the weaving machines can then be determined. The time-function of the power applied in a period to the particular weaving machines is different for each of said machines. If for instance a first weaving machine weaves 600 fillings per minute (10 Hz) and one weaving pattern comprises three fillings, a second weaving machine weaves at the rate of 720 fillings per minute (12 Hz) and one weaving pattern comprises six fillings, and a third weaving machines operates at 900 fillings per minute (15 Hz) and one weaving pattern comprises three fillings, then the period of the first weaving machine is 0.3 seconds, that of the second weaving machine is 0.5 seconds and that of the third weaving machine is 0.2 seconds. The period may be ascertained as the least common multiple of 0.3, 0.5 and 0.2. In this instance a periodic motion for a period of three seconds may be created for each weaving machine in the group. The various motions may be mutually phase-shifted in the manner already discussed above until the maximum value or the deviation from a given average value of the total power applied to the group of weaving machines becomes a minimum.

The above discussed procedure was based on an assumed motion for each machine and on a mutual matching of the phases of the various machines. Obviously the motion also may be matched for each machine. When the total power applied to the individual machines is a maximum at a given time, the power applied to one of these machines at that time may be slightly reduced. In order to keep the average machine speed constant, the power applied to it must be obviously raised at another time to maintain a constant average machine speed.

It is known from the patent document WO 99/27426 to specify a changed time-function of applied power whereby the machine may be powered at the same average speed. The contents of the patent document WO 99/27426 are referred to with respect to such a setpoint in the present application. Said document also discloses how to specify the changed motion based on the time-function of applied power. By taking into account the changed time-function of applied power and hence the changed motion, the above described procedure may be repeated for several maximum values and for several machines. Such a procedure additionally attains the function that the motion of a given machine is matched to the motion of another machine of that group and in that a particular value of the power applied to the group shall be bounded. As regards weaving machines for instance, the weaving machine's motion at filling beat-up can be assured to be always nearly constant, whereas changes in motion between two beat-ups will be permitted. This feature is important in avoiding streaks in a fabric.

In the above embodiment, all the applied power is determined or calculated by the control unit 11. Obviously, the total applied power applied during operation of the individual machines also may be measured. Depending on such a measurement, it is possible to optimize the phase shifts between the motions of the group's individual machines. This step may be implemented by somewhat changing the phase of one machine's motion while the machine is operating. In this way the effect on the value of the measured total applied power during machine operation can be determined without said value being significantly changed. In a corresponding manner, the motion of the particular machine may be adjusted optimally as a function of the other machine's motion. If a change in a given direction lowers, or changes less, the measured total applied power, changes in said direction may continue until a further change increases or more substantially varies the measured total applied power. If a change in one direction raises or significantly varies the measured total applied power, then a change in the opposite direction may be made until a further change in this direction again raises or significantly varies the measured total applied power. Such a procedure may be sequentially repeated for all machines until an optimum is established.

Appropriately the applied power shall only be measured after a setpoint corresponding to the calculated applied power has been implemented. Because the applied power may be very accurately determined in the manner disclosed in the patent document WO 99/27426, the procedure of calculating the applied power takes priority over the procedure of measuring it.

The invention makes it possible—in addition to considering the power applied by the power source—to specify the motions of the various mechanically independent machines also as a function of other representative parameters. The choice of representative parameters may depend on the weights ascribed to them. In corresponding manner and as discussed above, for instance the said motions may be matched to each other depending on a value of the measured noise level generated by the machines. Illustratively such a noise level is measured by an instrument set up between two machines. In corresponding manner, the magnitude of machine-generated vibrations may be measured. The latter measurement may for instance be implemented by placing a vibration tester on the floor supporting the individual machines of a group, and by processing this tester's output signal.

Figure 3:
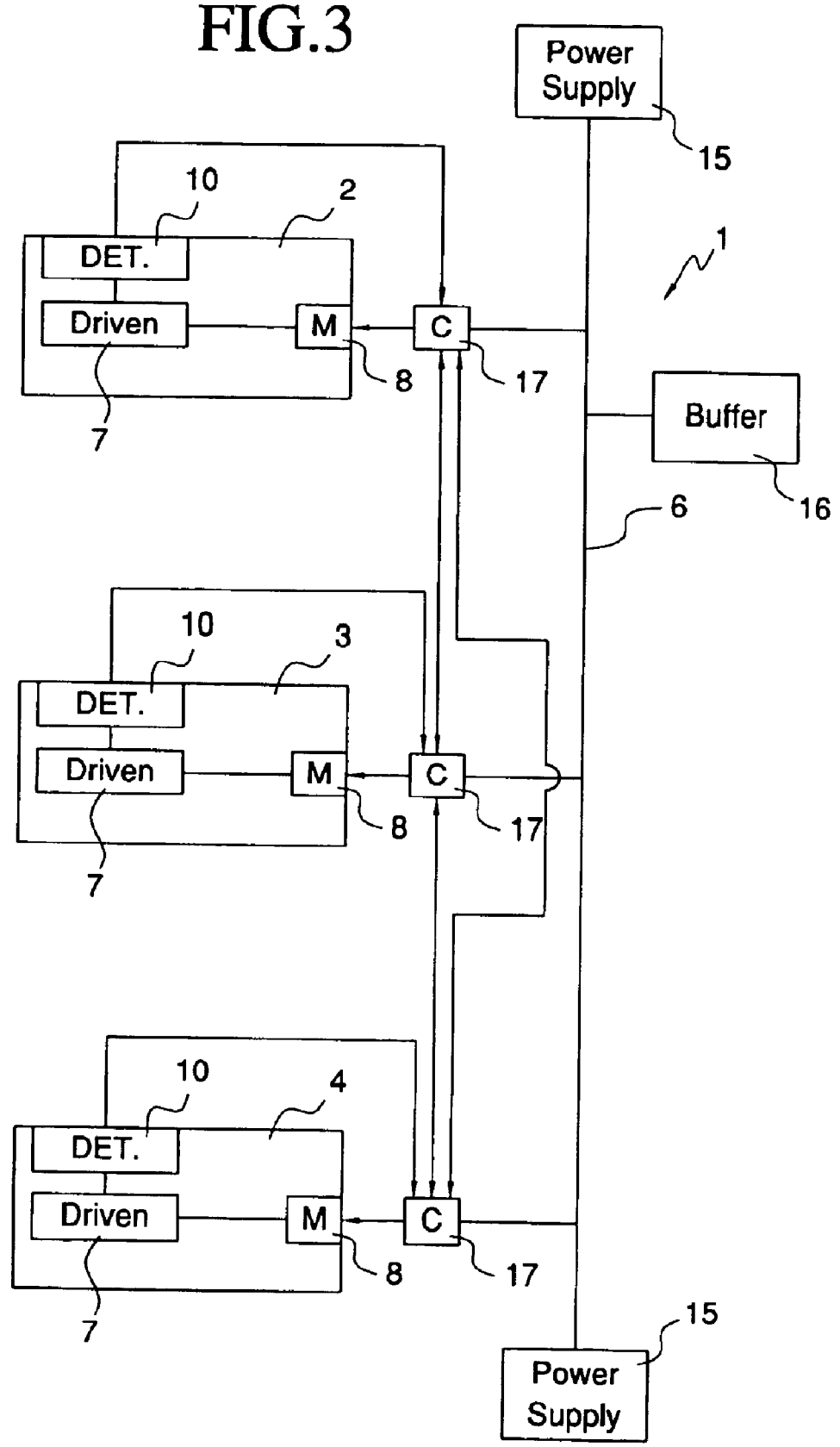
FIG. 3 is a modified control block diagram of the power applied to drive motors of a group of machines.

FIG. 3 shows an embodiment variation wherein the control assembly 1 comprises two interconnected electric power sources 5 and 15 feeding the group of machines 2, 3 and 4. Illustratively the power sources 5 and 15 are DC. In this embodiment the control assembly 1 also includes an electric energy buffer 16 connected to the power line 6 linking the two power sources 5 and 15 to the machines 2, 3 and 4. The energy buffer 16 for instance is a capacitor supplying or receiving energy to keep changes in power applied by the power sources 5 and 15 smaller than the changes in the total power applied to the machines 2, 3 and 4. In the embodiment of FIG. 3, the function of the central control unit 11 and the function of the switching unit 9 of FIG. 1 are replaced by the function of three local control units 17 associated with the particular drive motors 8. These control units 17 are interconnected and may exchange signals in order to replace the function of the central control unit 11. Also each control unit 17 is connected to a corresponding angular-position detector 10 and to a drive motor 8.

Figure 4:
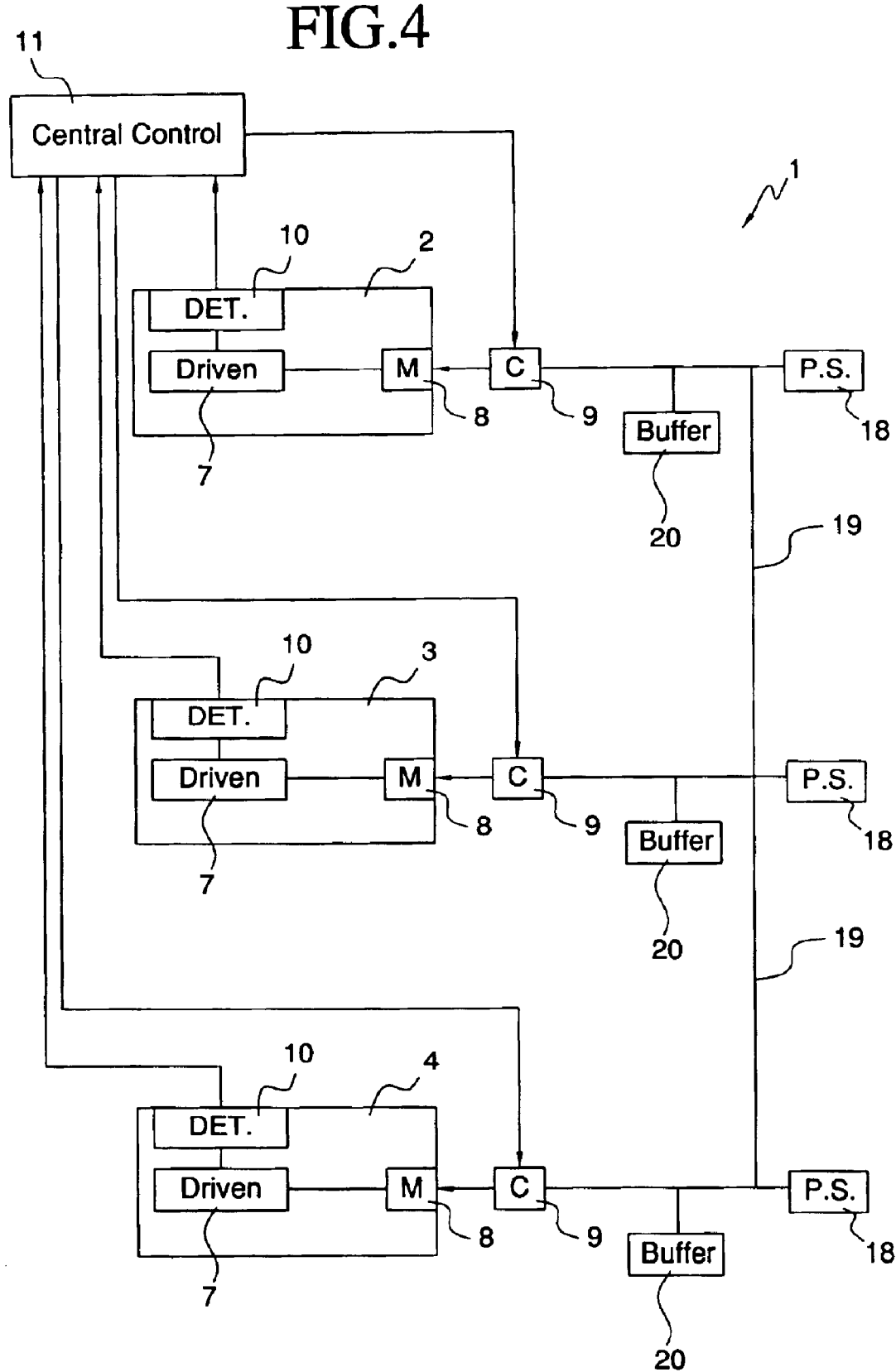
FIG. 4 is another embodiment of a control block diagram of the drive motors of a group of machines.

As regards the illustrative embodiment of FIG. 4, the control assembly 1 contains one electric power source 18 for each machine 2, 3 and 4. The electric power sources 18 of the group of machines 2, 3 and 4 are interconnected by electric lines 19. If the power sources 18 are DC, then preferably an electrical energy buffer 20 shall be used for each machine 2, 3 and 4. The connecting lines 19 also interconnect the energy buffers 20. As a result, the energy stored in the particular energy buffers 20 may be fed to each of the drive motors 8 of one of the machines 2, 3 or 4.

It should be clear that the invention is not restricted to a group of three machines. A group shall be comprised of at least two mechanically independent machines. If there are only two machines, maximum power may be applied to the drive motor of the first machine at a precise time when the drive motor of the other machine requires only minimal power. As a result, the sum of the power(s) supplied by the at least one power source to the two drive motors can be made to vary only a little. The advantages offered by the invention however are more pronounced when several machines are included in one group wherein the drive motors are controlled in accordance with the invention.

In the above described embodiments, each mechanically independent machine is equipped with only one drive motor. However, each machine also may be very easily equipped with several drive motors wherein, for instance, each motor drives a specific component of the machine in periodic motion. The periodic motions of the various components in this instance may be driven by a corresponding drive motor in a substantially synchronous manner, whereby the power applied by the power source to the individual drive motors of the machine may be considered as power applied to a single hypothetical drive motor absorbing the total applied power of the individual drive motors of the machine The invention is not limited to the above discussed parameters. Other parameters representative of a group of weaving machines also might be used. For instance, the heat generated by a group of weaving machines may be selected as a representative parameter. Again, by bounding a single representative parameter, one or more further parameters may easily be bounded. Illustratively the bounding of the maximum value of applied power also shall bound the generated heat and typically also vibrations and the noise level. Obviously the representative parameter also may be in the form of a combination of the applied power and/or the noise level and/or the vibrations. Another applicable parameter may be electrical efficiency of the power source(s). Again, the power source's power factor may be selected as a parameter, that is, the ratio of average applied power to the product of average applied voltage and the average applied current.

It is to be understood that combinations of the above discussed embodiment modes remain within the scope of the present invention. Also, the present invention is not limited to weaving machines. Instead other machines driven by one or more electric motors that carry out periodic motions may come within the scope of the present invention, for instance electric-motor driven compressors.

A group of machines may consist of all machines set up in one room or only a part of said machines. The control unit 11 also may be located outside said machine room remotely from the machines. The control unit also may be connected through a network including the machine's controls such as the Internet.

However the control assembly and the method according to the present invention are especially applicable to weaving machines. The invention not only offers improvement of electrical efficiency of a group of weaving machines, but also a reduction in vibrations and of the noise level that are generated by the group(s) of weaving machines of a weaving room. These advantages are substantial for weaving mills.

Obviously also, the invention is not restricted to the above described control assembly and method. Modifications of the illustrative embodiments also are encompassed by the present invention.

What is claimed is:

1. A method for powering electric drive motors of a group of at least of two machines wherein the drive motors of each machine operate with periodic motions and which motors receive time-function varying power from at least one electric power source, comprising the steps:

relating periodic motions of the motors of the at least two machines with respect to each other; and controlling a parameter including the time-function varying power supplied to each motor that is representative of the operation of the at least two machines as a function of the relationship of said periodic motions of the motors.

2. Method as claimed in claim 1, wherein the representative parameter is bounded at a maximum value and a change in the representative parameter is bounded at a specified value.

3. Method as claimed in claim 1, wherein the representative parameter is selected from one or more of the group consisting of the sum of the electric power applied to the drive motors; a magnitude of noise level generated by the machines and machine-caused vibrations.

4. Method as claimed in claim 1, wherein the time-function varying power supplied to the electric drive motor of at least one machine in a group of machines is controlled as a function of the periodic motion of the drive motor of at least one other machine in said group.

5. Method as claimed in claim 1, wherein the time-function varying power is applied to the drive motors of the machines as a function of a mutually related motor driven periodic motion of the machines.

6. Method as claimed in claim 5, wherein a periodic time-function of the time-function varying power applied to the drive motors of the machines is dependent on operating angular positions of the machines.

7. Method as claimed in claim 5, wherein a periodic time-function of applied time-function varying power to the drive motors is controlled by retrieving control parameters from a memory of a control.

8. Method as claimed in claim 5, wherein control of a periodic time-function of time-function varying power application to at least one drive motor is varied as a function of the operating angular position of at least one other machine.

9. Method as claimed in claim 1, wherein the time-function varying power supply to the drive motor of each machine of a group of machines is controlled in accordance with the same periodic motion and in that the time-function varying power supply to the drive motors of the machines of said group are mutually phase shifted.

10. Method as claimed in claim 1, wherein a change in the representative parameter is bounded at a specific value.

11. Method as claimed in claim 1, wherein the the time-function varying power supplied to the electric drive motors of all machines is controlled as a function of the periodic motions of the drive motors of all other machines in the group.

12. A control system for a group of machines each equipped with an electric drive motor receiving time-function varying power operating in periodic motion, said motors connected to at least one power source supplying electric power to the group of machines, said control system comprising:

control units arranged so as to mutually relate the periodic motions of the drive motors of at least two machines of said group and so as to control the time-function varying power supplied to each motor in accordance with a parameter representative of the operation of said at least two machines as a function of the relationship between the periodic motions of the drive motors.

13. Control system as claimed in claim 12, wherein each control unit is arranged to supply time-function varying power to the drive motors in a manner so as to maintain constant motor torque of each motor.

14. Control system as claimed in claim 12, wherein several interconnected power sources are arranged to supply power to the drive motors of the machines.

15. Control system as claimed in claim 14, wherein one power source applies power to each machine and is connected to the power source of the other machine(s).

16. Control system as claimed in claim 12, wherein at least one power source is a DC power source.

17. Control system as claimed in claim 12, wherein the drive motors are switched reluctance motors connected by switching units to at least one power source.

18. Control system as claimed in claim 12, wherein the machines are weaving machines having main drive shafts directly linked to the shafts of the associated drive motors.

19. Control system as claimed in claim 16, wherein the at least one power source contains at least one electrical energy buffer.

* * * * *